United States Patent

[11] 3,616,400

| [72] | Inventors | Kiyotaka Wasa;<br>Shigeru Hayakawa, both of Osaka, Japan |
|---|---|---|
| [21] | Appl. No. | 6,009 |
| [22] | Filed | Jan. 7, 1970 |
| [23] | | Division of Ser. No. 809,801,<br>Mar. 24, 1969 |
| [45] | Patented | Oct. 26, 1971 |
| [73] | Assignee | Matsushita Electric Industrial Co., Ltd.<br>Osaka, Japan |
| [32] | Priorities | Mar. 25, 1968 |
| [33] | | Japan |
| [31] | | 43/19851;<br>Sept. 13, 1968, Japan, No. 43/66390; Sept. 13, 1968, Japan, No. 43/66391; Sept. 13, 1968, Japan, No. 43/66389 |

[54] METHOD OF MAKING THIN FILM CAPACITOR
4 Claims, 3 Drawing Figs.

[52] U.S. Cl. ......................................................... 204/192
[51] Int. Cl. ..................................................... C23c 15/00
[50] Field of Search ............................................ 204/192, 298

[56] References Cited
UNITED STATES PATENTS

| 3,391,071 | 7/1968 | Theuerer ....................... | 204/192 |
| 3,418,229 | 12/1968 | Larshmanan et al. ........ | 204/192 |
| 3,522,164 | 7/1970 | Sumner ......................... | 204/192 |
| 3,528,902 | 9/1970 | Wasa et al. .................... | 204/192 |
| 3,242,006 | 3/1966 | Gerstenberg .................. | 204/192 |

*Primary Examiner*—John H. Mack
*Assistant Examiner*—Sidney S. Kantor
*Attorney*—Wenderoth, Lind & Ponack

ABSTRACT: A method of making a thin film capacitor. A base electrode is formed in the form of a thin titanium metal film on a substrate. A tin dielectric layer is formed on the titanium metal film by sputtering from a composite cathode. The cathode consists essentially of lead and titanium, and the atmosphere in the sputtering atmosphere is oxidizing atmosphere, so that the thin dielectric layer consists essentially of lead oxide and titanium oxide.

PATENTED OCT 26 1971 3,616,400

KIYOTAKA WASA and
SHIGERU HAYAKAWA,

INVENTORS

BY *Wenderoth, Lind & Ponack*

ATTORNEYS

METHOD OF MAKING THIN FILM CAPACITOR

This application is a division of our copending application Ser. No. 809,801, filed Mar. 24, 1969.

PROBLEMS IN THE ART

Thin film capacitors having a high capacitance value and yet which occupy only a small space and which have a low-loss factor are becoming increasingly important in the production of microelectronic circuits. At present, low-loss thin film capacitors having capacitance values of approximately 0.01μf./sq. cm. can be made with a silicon monoxide dielectric material and capacitors having a capacitance of approximately 0.1μf./sq. cm. can be made with a tantalum oxide dielectric material. Higher values of capacitance per sq.cm. are necessary for use in some types of microelectronic circuits, such as audio amplifiers. Such higher values can be achieved in a number of ways. For example, a multilayer stack consisting of alternate layers of dielectric and suitable metal films can be deposited on a substrate. Another method is to reduce the thickness of the dielectric. These methods, however, have the following shortcomings. The former requires a process that involves the complicated steps of successive evaporation through different accurately registered masks. The latter naturally produces a capacitor having a lower breakdown voltage. A further approach has been to use a dielectric with a higher permittivity, such as a titanium dioxide dielectric. However, a thin film of titanium dioxide often has a low-dielectric strength. Such capacitors cannot be widely used in the microelectronic circuits.

An object of the present invention is to provide a method of making thin film capacitor having a high capacity a low-loss factor and high dielectric strength.

Another object of the present invention is to provide a method of making a thin film capacitor having a high capacity, a low-loss factor and high dielectric strength.

These and other objects of the invention will be apparent from the following description taken together with the accompanying drawings, wherein.

DESCRIPTION OF THE PREFERRED EMBODIMENT

Figure 1:
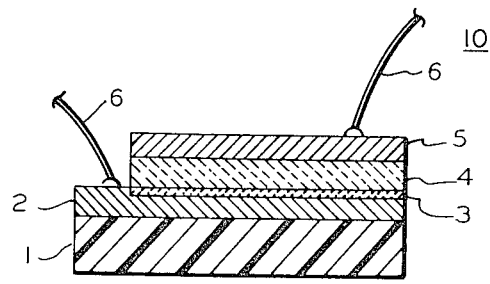
FIG. 1 is a cross-sectional view of a thin film capacitor in accordance with the present invention.

Referring to FIG. 1, the thin film capacitor 10 according to the present invention comprises a dielectric layer 4 sandwiched between a top electrode 5 and a base titanium electrode 2 deposited on a substrate 1. Said base titanium electrode 2 has an oxide layer 3 thereon at the surface facing said dielectric layer 4. Said dielectric layer 4 consists essentially of a mixture of lead oxide and titanium oxide. Two lead wires 6 are connected in conductive relationship to said top electrode 5 and said base titanium electrode 2, respectively.

Said base titanium electrode 2 has a thickness of from 2,000 to 5,000 A. Said dielectric layer 4 has a thickness of from 1,000 to 5,000 A. Said top electrode 5 can be made of any conventional conductive metal such as gold and has a thickness of from 1,000 to 3,000 A. Said substrate 1 can be made of suitable material in plate form, such as alumina, glass, or any other plate material having a smooth surface.

Referring again to FIG. 1, the thin film capacitor 10 according to the present invention can be prepared by first depositing a thin titanium metal film to serve as the base electrode 2 on the substrate 1. Then a dielectric layer 4 consisting essentially of a mixture of lead oxide and titanium oxide is formed on said thin titanium metal film 2 by sputtering from a composite cathode consisting essentially of lead and titanium in an oxidizing atmosphere. This causes said titanium metal film 2 to be oxidized at the surface facing said dielectric layer 4 so as to form a titanium oxide layer 3. Another thin metal film is then deposited on the layer 4 to serve as a top electrode 5. The thin titanium metal film which serves as the base electrode and the other thin metal film which serves as the top electrode are formed by any suitable depositing method, such as a conventional vacuum deposition method.

It is preferable that said substrate be kept at a temperature ranging from 100° to 300° C. during said sputtering process. The temperature at which said substrate is kept has a great effect on the capacity of the resultant thin film capacitor. The reason that the temperature at which said substrate is kept has a great effect on the capacity of the resultant thin film capacitor is not wholly understood as yet. A temperature higher than 300° C. causes the surface of said base electrode to have a coarse structure which may be the cause of the reduced capacity of the resultant thin film capacitor.

It has been discovered according to the present invention that making the base electrode of titanium having a titanium oxide layer formed thereon produces a higher capacity than when the base electrode is made of aluminum, which has been widely used heretofore, as shown in table 1.

Table 1 is a comparison of the capacity of two kinds of thin film capacitors which were prepared in the same way except for the base electrode materials. Both capacitors had dielectric layers about 1,500 A. thick sputtered from a composite cathode consisting of 50 atomic percent of lead and 50 atomic percent of titanium. The sputtering was carried out on a glass substrate kept at 200° C.; the sputtering atmosphere was argon gas including oxygen at a partial pressure of $2 \times 10^{14}$ Torr.

TABLE 1

| Base Electrode Materials | Top Electrode Materials | Capacity per sq. cm. (μf.) |
|---|---|---|
| Aluminum | Gold | 0.6 |
| Titanium | Gold | 1 |

Table 2 shows the effect of the substrate temperature on the capacity of a thin film capacitor prepared in the same way as described in connection with table 1. It will be readily understood from table 2 that operable temperatures are from 100° to 300° C. and preferred temperatures are from 150° to 250° C.

TABLE 2

| Substrate Temperature (° C.) | Capacity per sq. cm. (μF) |
|---|---|
| 70 | 0.2 |
| 100 | 0.4 |
| 150 | 0.9 |
| 200 | 1 |
| 250 | 0.95 |
| 300 | 0.4 |
| 330 | 0.1 |

Base electrode: Titanium 3,000 A. thick
Top electrode: Gold, 2,000 A. thick
Thickness of the dielectric layer: 1,500A.
Weight percent of lead in composite cathode of sputtering apparatus: 10 percent
Weight percent of titanium in composite cathode of sputtering apparatus: 90 percent
Thickness of the oxide layer: about 50A. Oxygen partial pressure during the sputtering: $2 \times 10^{14}$Torr.

The preferred composition of said composite cathode of the sputtering apparatus for giving the thin film capacitor a high capacity consists essentially of a mixture of 8 to 22 percent by weight of lead and 78 to 92 percent by weight of titanium as shown in table 3.

TABLE 3

| Weight % of lead in composite cathode | Weight % of titanium in composite cathode | Capacity per sq. cm. ($\mu$F) |
| --- | --- | --- |
| 0 | 100 | 0.5 |
| 5 | 95 | 0.6 |
| 8 | 92 | 0.8 |
| 10 | 90 | 1 |
| 20 | 80 | 0.8 |
| 22 | 78 | 0.6 |
| 30 | 70 | 0.3 |
| 50 | 50 | 0.25 |
| 100 | 0 | 0.25 |

Base electrode: Titanium, 3,000 A. thick
Top electrode: Gold, 2,000 A. thick
Thickness of dielectric layer: 1,500A.
Thickness of the oxide layer: about 50A.
Oxygen partial pressure during the sputtering: $2 \times 10^{14}$ Torr
Substrate temperature during deposition of the dielectric layer: 200° C.

The composite cathode can be prepared by using any available and suitable method. A preferred method is to press a mixture of lead and titanium metal in powder form having particles of a size of from 100 to 300 mesh at a pressure of 30,000 to 75,000 p.s.i. Use of such a composite cathode consisting essentially of a mixture of 8 to 22 percent by weight of lead and 78 to 92 percent by weight of titanium produces a thin film capacitor having a dielectric layer which includes a lead-titanate phase having a high permittivity.

It has been discovered, according to the present invention, that said thin film capacitor can be given improved insulating properties by sputtering in an oxidizing atmosphere including oxygen at a partial pressure ranging from $2 \times 10^{14}$ to $2 \times 10^{13}$ Torr. At an oxygen partial pressure below $2 \times 10^{14}$ Torr, the resultant thin film capacitor has poor insulating properties. At an oxygen partial pressure above $1 \times 10^{13}$ Torr, the resultant thin film capacitor also has poor insulating properties.

It is preferred that the sputtering process used for preparation of said dielectric layer be conducted in a magnetic field by using a magnetron-type sputtering apparatus described in a copending U.S. application Ser. No. 672,516.

Figure 2:
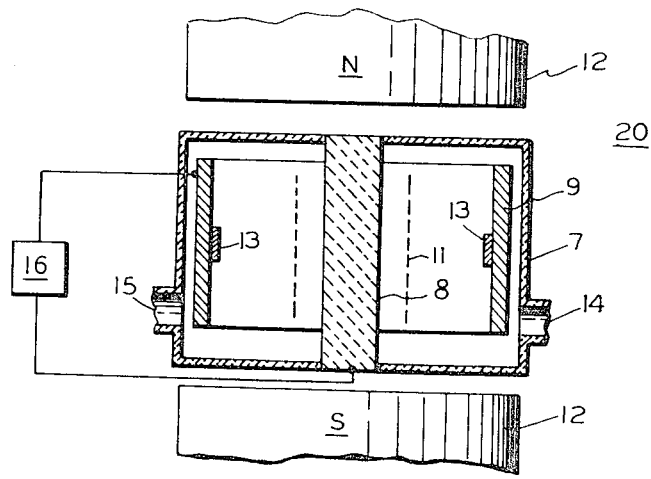
FIG. 2 is a diagrammatic, longitudinal, sectional view of a cathodic sputtering apparatus having a cold-cathode magnetron geometry.
Figure 3:
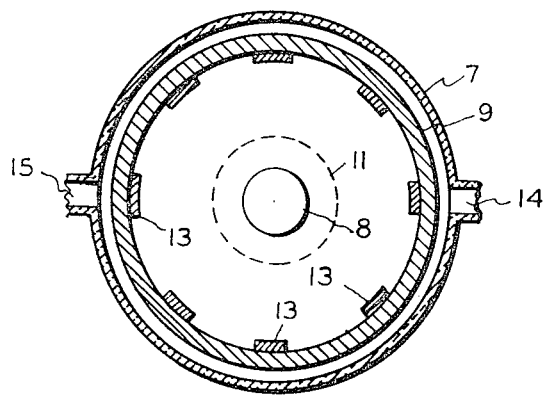
FIG. 3 is a cross-sectional view of the cathodic sputtering apparatus of FIG. 2.

Referring to FIGS. 2 and 3, there is illustrated a magnetron-type sputtering apparatus 20 comprised of a pair of cylindrical electrodes 8 and 9 mounted within a cylindrical envelope 7 having an inlet 14 and an outlet 15. Said electrodes 8 and 9 are connected across a voltage supply source 16. Either of said cylindrical electrodes 8 and 9 can be the cathode, but it is preferred that said inner electrode 8 be the cathode as indicated in FIGS. 2 and 3. Substrates 13 to be coated are secured to the anode. The cylindrical envelope 7 contains an ionizable medium and can be made of any gastight, nonmagnetic material.

Said cylindrical envelope 7 containing said pair of electrodes is placed in a magnetic field parallel to the sides of said cylindrical electrodes 8 and 9 so that said field is transverse to the discharge from said electrodes. Said field can be supplied by any available magnetic field creating means 12, such as an electromagnet externally attached across the flat end surfaces of said cylindrical envelope 7.

The ionizable medium can be a reactive gas such as oxygen or a mixture of oxygen and argon gas. The cathode is a composite cathode of lead and titanium metal, as described hereinbefore.

It has been discovered, according to the present invention, that a magnetic field higher than about 1,000 gauss makes it possible to form the dielectric layer at a high-deposition speed.

In the magnetron-type sputtering apparatus 20 shown in FIGS. 2 and 3, a very uniform dielectric layer can be obtained by locating a negatively biased auxiliary electrode 11 near the cathode. Said auxiliary electrode comprises a cylindrical screen of titanium metal and makes possible the production of a dielectric layer of high permittivity with great accuracy.

It is thought that the invention will be understood from the following examples. It is apparent that various changes can be made in the methods of depositing base electrodes or top electrodes, the materials of the substrates, the size of the parts and the conditions of sputtering for depositing a dielectric layer without departing from the spirit and scope of the invention.

Example 1

A thin film capacitor is made by using a conventional vacuum evaporation apparatus and a conventional planar electrode sputtering apparatus. A base electrode of a film of titanium having a thickness of about 3,0003,000 deposited on a glass substrate of 0.7 mm. thick by vacuum evaporation at a residual gas pressure of less than $1 \times 10^{16}$ Torr. A dielectric layer about 1,500 A. thick is deposited over said base electrode by sputtering from a composite cathode consisting of lead and titanium in an oxidizing atmosphere of mixed gas of argon and oxygen. The percent by weight of lead and that of titanium in said composite cathode is 10 and 90 percent, respectively. The total pressure of said mixed gas is about $1 \times 10^{1}$Torr and the partial pressure of said oxygen gas is about $2 \times 10^{14}$ Torr. The substrate is kept at a temperature of about 200° C. during the sputtering. A top electrode in the form of a gold film about 2,000 A. thick is deposited over said dielectric layer by vacuum evaporation at a residual gas pressure of less than $1 \times 10^{16}$ Torr. Two gold lead wires 0.1 mm. in diameter and bonded to the top electrode and the base electrode, respectively. The resultant thin film capacitor has a capacity of about $1 \mu f./cm.^2$, a loss factor of 10 percent or less and a breakdown voltage of 7.5 volts or more.

Example 2

A thin film capacitor is made by using a conventional vacuum evaporation apparatus and a magnetron-type sputtering apparatus. A base electrode of titanium in a film about 3,000 A. thick is deposited on a glass substrate of 0.7 mm. thick by sputtering from a titanium cathode in pure argon at a pressure of $1 \times 10^{14}$ Torr by using a magnetron-type sputtering apparatus in a magnetic field of 3,000 gauss. A dielectric layer about 1,500 A. thick is deposited over said base electrode by sputtering from a composite cathode consisting of lead and titanium in an oxidizing atmosphere of mixed argon and oxygen using a magnetron-type sputtering apparatus in a magnetic field of 7,000 gauss. The percent by weight of lead and that of titanium in said composite cathode is 10 percent and 90 percent, respectively. The total pressure of said mixed gas is about $6 \times 10^{14}$ Torr and the partial pressure of said oxygen gas is about $2 \times 10^{14}$ Torr. The substrate temperature is kept at about 200° C. during the sputtering. A top electrode in the form of a gold film about 2,000 A. thick is deposited over said dielectric layer by vacuum evaporation at a residual gas pressure of less than $1 \times 10^{16}$ Torr. Two gold wires 0.1 mm. in diameter are bonded to the top electrode and the base electrode, respectively. The resultant thin film capacitor has a capacity of about $1 \mu F./cm.^2$, a loss factor of 1 percent or less and a breakdown voltage of 15 volts or more.

What is claimed is:

1. A method of making a thin film capacitor comprising depositing a base electrode in the form of a thin titanium metal film on a substrate, and while keeping said substrate at a temperature of from 100° to 300° C. forming on said thin titanium metal film a thin dielectric layer consisting essentially of a mixture of lead oxide and titanium oxide by sputtering in an oxidizing atmosphere including oxygen at a partial pressure of $2 \times 10^{14}$ to $2 \times 10^{13}$ Torr from a composite cathode consisting essentially of lead and titanium, whereby said titanium metal film is oxidized at the surface facing said dielectric layer, and finally depositing a top electrode on said thin dielectric layer in the form of another thin metal film.

2. A method for making a thin film capacitor as claimed in claim 1 wherein said composite cathode consists essentially of a mixture of 8 to 22 percent by weight of lead and 78 to 92 percent by weight of titanium.

3. A method of making a thin film capacitor as claimed in claim 1 in which said sputtering process is conducted by applying a magnetic field parallel to the axis of a magnetron-type sputtering apparatus of a coaxial cylinder type having said composite cathode in the form of a cylinder surrounded by a cylindrical anode and having a cylindrical auxiliary titanium electrode around said cathode near said cylindrical cathode, the parts being enclosed in a gastight envelope, and placing said substrate with said base electrode on said anode opposite the cathode.

4. A method of making a thin film capacitor as claimed in claim 3 in which the strength of said magnetic field is more than 1,000 gauss.

* * * * *